Patented Mar. 9, 1954

2,671,782

UNITED STATES PATENT OFFICE 2,671,782

PREPARATION OF PENICILLIN SALTS

Winston Kennay Anslow, Barnard Castle, England, assignor to Glaxo Laboratories Limited, Greenford, England, a British company No Drawing. Application April 6, 1948,
Serial No. 19,431

3 Claims. (Cl. 260—239.1)

This invention is concerned with improvements in and relating to the preparation of alkali salts of penicillin.

The extraction of penicillin from the metabolism solution in which it is produced, and its purification as well as the preparation of its alkali salts in substantially pure form, have presented many difficulties. U. S. specifications Serial Nos. 720,472 filed January 6, 1947, now abandoned, and 726,434 filed February 4, 1947, described processes for the preparation in a high state of purity of salts of penicillin in which crude penicillin or its metallic salts are converted into salts of certain primary organic bases as there defined. Similarly U. S. specification Serial No. 710,420 filed November 18, 1946, now abandoned, describes a process for the same purpose in which crude penicillin or its metallic salts are converted into salts of certain tertiary organic bases as there defined.

The above-mentioned specifications also describe how the organic base salts of penicillin can be converted into metallic, e. g. sodium, salts by treating them under suitable conditions with acid, such as phosphoric acid, extracting the liberated penicillin into a solvent such as chloroform, extracting the organic extract with aqueous sodium hydroxide and freeze-drying the aqueous extract.

The difficulty of preparing alkali salts of penicillin G and especially the sodium salt, in adequate purity is largely due to the fact that they are very soluble in water. The term "alkali" as used herein is intended to include the ammonium group $NH_4-$.

The object of the present invention is to overcome this difficulty and to provide an improved process whereby alkali salts of penicillin G can be prepared in a substantially pure state by a novel and greatly simplified technique.

I have found that if a salt of penicillin G and a suitable organic base, is brought into contact with an alkali salt of a suitable acid in the presence of a suitable liquid medium, as hereinafter defined, a base exchange reaction takes place whereby the alkali salt of penicillin G is formed and crystallises from the liquid medium, from which it can be removed whilst the other product or products of the reaction will remain dissolved in the said medium.

The term "a suitable organic base," as used herein, means any primary, secondary or tertiary organic base which does not rapidly destroy penicillin G and which will form crystalline salts with it. At present I prefer to use any of the following substances, which are therefore specifically included within the meaning of the said term: cyclohexylamine, methylcyclohexylamine, monoethylamine, triethylamine, isopropylamine, n-butylamine, N-ethylpiperidine, phenylethylamine, an N-ethylhexahydropicoline, and N-ethylpyrolidine.

The term "suitable acid" as used herein means any aliphatic acid which does not rapidly destroy penicillin G under the conditions of the reaction and which has not more than eight carbon atoms in the straight aliphatic chain, but does not include formic acid. Generally I have found that it is desirable that the suitable acid should be an aliphatic monocarboxylic acid or an alkyl or aryl substituted aliphatic monocarboxylic acid; examples of such acids are acetic acid, propionic acid, valeric acid, caproic acid and caprylic acid, acetic acid being preferred. These acids may be characterized as being unsubstituted, alkyl substituted or monophenyl substituted saturated aliphatic monocarboxylic acids containing from 2 to 8 carbon atoms in the straight aliphatic chain. Aliphatic acids bearing substituents other than alkyl or aryl groups are not suitable for the process according to the invention.

According to the invention therefore I provide a process for the preparation of alkali salts of penicillin G in which a salt of penicillin G and a suitable organic base as herein defined is reacted, in the presence of a suitable liquid medium as herein defined, with an alkali salt of a suitable acid as herein defined.

According to a further feature of the invention the suitable acid is an aliphatic monocarboxylic acid or an alkyl or aryl substituted aliphatic monocarboxylic acid.

The resulting crystalline alkali salt of penicillin G may according to the invention be removed from the reaction products, and may if desired be further purified, as for example by recrystallisation.

As a suitable liquid medium I may use any solvent or mixture of solvents in which the organic base salt of penicillin and the alkali salt of the suitable acid are to some extent soluble but in which the alkali salt of penicillin G is substantially insoluble; it is also desirable that the salt of the organic base and the suitable acid formed in the reaction should be soluble in the liquid medium so that it is not precipitated with the alkali salt of penicillin G. The liquid medium should of course be free from impurities that destroy penicillin G. At present I prefer to use a monohydric alcohol or mixtures of monohydric alcohols as the suitable liquid medium, and examples of such alcohols are iso-propyl alcohol, butanol, amyl alcohol, benzyl alcohol, ethanol, and n-octyl alcohol, butanol being preferred. Dihydric glycols are found to be unsuitable but I may use ethylene glycol monoethyl ether. Certain solvents which by themselves would be unsuitable for the process according to the invention can be used when mixed with a sufficient quantity of a suitable solvent such as a monohydric alcohol, thus I may use a mixture of petroleum ether and butanol containing 1 part by volume of petroleum ether to 2.5 parts by volume of butanol.

According to a still further feature of the invention therefore the suitable liquid medium is a monohydric alcohol or a mixture containing one or more monohydric alcohols.

I prefer to prepare a suspension of the organic base salt in the liquid medium and a suspension (or "gel") of the alkali salt in the same medium and to add either of these preparations to the ether and then, if necessary to agitate and/or warm the mixture so as to bring about the desired reaction.

It may here be mentioned that I have found that if crystalline sodium acetate which contains three molecules of water, is warmed with an appropriate quantity of butanol, there is a sudden change from the tablet-form of sodium acetate to a fine needle-form which fills the whole liquid and converts it to a gel-like substance, which can conveniently be used for the purpose of the reaction.

In order to facilitate a better understanding of the invention the following examples of how it may be carried into effect are given only as illustrations:

Example 1

216.5 g. of the cyclohexylamine salt of penicillin G were suspended and partly dissolved in 1250 ml. of butanol and added with stirring to a "gel" of 75 g. of crystalline sodium acetate ($3H_2O$) in 500 ml. of butanol which was at a temperature of about 60° C. and which had been prepared by simple heating. On the addition of the cyclohexylamine salt to the "gel" the mixture became clear, both components dissolving. Within a few seconds the sodium penicillin G began to crystallize in plates. The separation appeared to be complete within one-and-a-half hours. Yield 119 g., assaying at 1615 iu/mgm.

70 g. of this preparation were dissolved in 280 ml. of 90% acetone (v./v.) to give a clear solution. The addition of 3080 ml. of undiluted acetone gave a quantitative recovery.

Example 2

4.33 g. of the cyclohexylamine salt of penicillin G were suspended and partly dissolved in 25 ml. of butanol and added to 0.8 g. of finely powdered anhydrous sodium acetate suspended and partly dissolved in 10 ml. of butanol at about 60° C. The mixture was shaken vigorously and maintained at about 60° for five minutes, during which time the mixture became almost clear and then began to deposit sodium penicillin. The reaction-mixture was cooled and allowed to stand for two hours. Yield 1.4 g., assaying at 1560 iu/mgm.

Example 3

4.33 g. of the cyclohexylamine salt of penicillin G were suspended and partly dissolved in 25 ml. of amyl alcohol and added to a "gel" of 1.4 g. crystalline sodium acetate ($3H_2O$) in 10 ml. of amyl alcohol which was at a temperature of about 60° C. and which had been prepared by simple heating. The mixture was warmed and maintained at about 60° and shaken for about two minutes by which time the deposition of the sodium penicillin G had begun. The reaction-mixture was cooled and allowed to stand for two hours. Yield 1.85 g., assaying at 1620 iu/mgm.

Example 4

4.33 g. of the cyclohexylamine salt of penicillin G were suspended and partly dissolved in 25 ml. of benzyl alcohol and added to a "gel" of 1.4 g. of crystalline sodium acetate ($3H_2O$) in 10 ml. of benzyl alcohol which was at a temperature of about 60° C. and which had been prepared by simple heating. The mixture was warmed and maintained at about 60° for a minute, by which time it had become entirely clear. The reaction-mixture was cooled and soon began to deposit sodium penicillin G in sheaves of thin plates. After standing 2 hours the crystals were filtered. Yield 0.9 g., assaying at 1475 iu/mgm.

Example 5

4.33 g. of the cyclohexylamine salt of penicillin G were suspended and partly dissolved in 25 ml. of butanol and added to 1 g. finely powdered sodium propionate suspended and partly dissolved in 10 ml. butanol at about 60° C. The mixture was shaken vigorously and maintained at about 60° for five minutes. Sodium penicillin G commenced to crystallize in hexagonal plates. The mixture was cooled and allowed to stand for two hours. Yield 1.9 g., assaying at 1510 iu/mgm.

Example 6

4.33 g. of the cyclohexylamine salt of pencillin G were suspended and partly dissolved in 25 ml. butanol and added to a "gel" of 1.2 g. of sodium iso-butyrate in 10 ml. butanol which was at a temperature of about 60° C. and which had been prepared by simple heating. The sodium penicillin G separated in elongated plates which after cooling and standing for two hours were filtered. Yield 1.7 g., assaying at 1625 iu/mgm.

Example 7

4.33 g. of the cyclohexylamine salt of penicillin G were suspended and partly dissolved in 25 ml. butanol and added to a "gel" of 1.25 g. of sodium valerate in 10 ml. butanol which was at a temperature of about 60° C. and which had been prepared by simple heating. The sodium penicillin G after cooling and standing for two hours was filtered. Yield 1.7 g., assaying 1665 iu/mgm.

Example 8

4.33 g. of the cyclohexylamine salt of pencillin G were suspended and partly dissolved in 25 ml. butanol and added to a solution of 1.5 g. of sodium caproate in 10 ml. of butanol which was at a temperature of about 60° C. The mixture became entirely clear and quickly deposited sodium penicillin G in hexagonal plates. The reaction-mixture was cooled and allowed to stand for two hours. Yield 1.8 g., assaying 1585 iu/mgm.

Example 9

4.33 g. of the cyclohexylamine salt of penicillin G were suspended and partly dissolved in 25 ml. butanol and added to a solution of 1.6 g. of sodium caprylate in 10 ml. of butanol which was at a temperature of about 60° C. The reaction-mixture was shaken vigorously, cooled and allowed to stand for two hours, when the sodium penicillin G which had separated was filtered. Yield 1.45 g., assaying 1600 iu/mgm.

Example 10

4.33 g. of the cyclohexylamine salt of penicillin G were suspended and partly dissolved in 25 ml. butanol and added to a solution of 1.8 g. of sodium phenylacetate in 10 ml. of butanol which was at a temperature of about 60° C. The mixture was shaken vigorously and maintained at about 60° C. for a minute by which time it had become entirely clear. The reaction-mixture was cooled and allowed to stand two hours and the sodium penicillin G which had separated was filtered. Yield 1.65 g., assaying 1645 iu/mgm.

Example 11

4.33 g. of the cyclohexylamine salt of penicillin G were suspended and partly dissolved in 30 ml. ethanol and added to a "gel" of 1.4 g. of crystalline sodium acetate (3H₂O) in 10 ml. of butanol which was at a temperature of about 60° C. and which had been prepared by simple heating. On shaking a clear solution was obtained which was cooled and on standing deposited hexagonal plates of sodium penicillin G. After two hours the crystals were filtered. Yield 0.65 g., assaying at 1480 iu/mgm.

Example 12

4.33 g. of the cyclohexylamine salt of penicillin G were suspended and partly dissolved in 25 ml. of butanol and added to 1.4 g. of crystalline sodium acetate (3H₂O) suspended and partly dissolved in 10 ml. of amyl alcohol at about 60° C. The mixture was shaken, cooled and allowed to stand two hours. The sodium penicillin G which separated was filtered. Yield 1.5 g., assaying at 1595 iu/mgm.

Example 13

4.33 g. of the cyclohexylamine salt of penicillin G were suspended and partly dissolved in 25 ml. n-octyl alcohol and added to a "gel" of 1.4 g. of crystalline sodium acetate (3H₂O) in 10 ml. of butanol which was at a temperature of about 60° C. and which had been prepared by simple heating. The mixture was shaken vigorously and maintained at about 60° for five minutes, during which time the separation of sodium penicillin G began. The reaction-mixture was allowed to stand for two hours and then filtered. Yield 0.6 g., assaying at 1555 iu/mgm.

Example 14

3.9 g. of the iso-propylamine salt of penicillin G were suspended and partly dissolved in 25 ml. of butanol and added to a "gel" of 1.4 g. of crystalline sodium acetate (3H₂O) in 10 ml. of butanol which was at a temperature of about 60° C. and which had been prepared by simple heating. The mixture was shaken vigorously and maintained at about 60° for five minutes when the sodium penicillin G began to separate in hexagonal plates. The reaction-mixture was cooled and allowed to stand for two hours and then filtered. Yield 1.7 g., assaying at 1515 iu/mgm.

Example 15

2.3 g. of the phenylethylamine salt of penicillin G was suspended and partly dissolved in 12.5 ml. of butanol and added to a "gel" of 0.7 g. of crystalline sodium acetate (3H₂O) in 10 ml. of butanol which was at about 60° C. and which had been prepared by simple heating. The mixture was shaken and rapidly became clear. Quickly the sodium penicillin G began to separate in hexagonal plates. The reaction-mixture was cooled and allowed to stand two hours. Yield 0.9 g., assaying at 1625 iu/mgm.

Example 16

4.5 g. of the N-ethylpiperidine salt of penicillin G were suspended and partly dissolved in 25 ml. of butanol and added to a "gel" of 1.4 g. of crystalline sodium acetate (3H₂O) in 10 ml. of butanol at about 60° C. which had been prepared by simple heating. Sodium penicillin G quickly began to separate in hexagonal plates. The reaction-mixture was cooled and allowed to stand two hours, when the sodium penicillin G was filtered. Yield 2.2 g., assaying at 1660 iu/mgm.

Example 17

4.5 g. of the N-ethylpiperidine salt of penicillin G were suspended and partly dissolved in 25 ml. of amyl alcohol and added to 1.25 g. of sodium iso-valerate suspended and partly dissolved in 10 ml. of amyl alcohol at about 60° C. The mixture was shaken vigorously and sodium penicillin G began to separate. The reaction-mixture was cooled and allowed to stand for two hours and then filtered. Yield 3.3 g., assaying at 1595 iu/mgm.

Example 18

4.5 g. of the N-ethylpiperidine salt of penicillin G suspended and partly dissolved in 25 ml. of butanol were added to a solution of 1.6 g. of sodium caprylate in 10 ml. of butanol at about 60° C. The reaction-mixture was shaken vigorously, cooled and allowed to stand two hours. The sodium penicillin G which separated was filtered. Yield 3.1 g., assaying at 1660 iu/mgm.

Example 19

4.35 g. of the triethylamine salt of penicillin G were suspended and partly dissolved in 25 ml. of butanol and added to a "gel" of 1.4 g. of crystalline sodium acetate (3H₂O) in 10 ml. butanol at about 60° C., which had been prepared by simple heating. Sodium penicillin G quickly began to separate. The reaction-mixture was cooled and allowed to stand two hours, when the sodium penicillin G was filtered. Yield 1.6 g., assaying at 1615 iu/mgm.

Example 20

4.35 g. of the triethylamine salt of penicillin G were suspended and partly dissolved in 25 ml. butanol and added to a solution of 1.5 g. of sodium caproate in 10 ml. of butanol at about 60° C. The reaction-mixture was shaken vigorously, cooled and allowed to stand two hours. The sodium penicillin G which separated was filtered. Yield 0.82 g., assaying at 1620 iu/mgm.

Example 21

2.25 g. of the N-ethylpyrrolidine salt of penicillin G were suspended and partly dissolved in 12.5 ml. of butanol and added to a "gel" of 0.7 g. of crystalline sodium acetate (3H₂O) in 5 ml. of butanol at about 60° C., which had been prepared by simple heating. The mixture rapidly became clear and the sodium penicillin G quickly separated in hexagonal plates. The reaction-mixture was cooled, allowed to stand two hours and filtered. Yield 1.1 g., assaying at 1600 iu/mgm.

Example 22

To 4.33 g. of the cyclohexylamine salt of penicillin G suspended and partly dissolved in 25 ml. of butanol was added 1 g. (2% excess) of potassium acetate suspended and partly dissolved in 10 ml. of butanol. The mixture was warmed and maintained at 50°–60° C. and shaken vigorously for a minute or two until all traces of potassium acetate had disappeared. The mixture was cooled and allowed to stand for 30 minutes. The potassium salt which had crystallised in flat needles was filtered and air-dried. Yield 3.0 g., assaying at 1530 iu/mgm.

2.05 g. of the above preparation were dissolved in the minimum (25 ml.) of 90% acetone (v./v.) by shaking. After filtration from traces of undissolved material, 10 volumes (250 ml.) of undiluted acetone were added. The potassium penicillin G separated immediately in broad blades, filtered after an hour's standing and air-dried. Yield 1.81 g., assaying at 1560 iu/mgm.

Example 23

4.33 g. of the cyclohexylamine salt of penicillin G suspended and partly dissolved in 25 ml. of iso-propyl alcohol were added to 1 g. of potassium acetate suspended and partly dissolved in 10 ml. of iso-propyl alcohol at about 60° C. The mixture was shaken vigorously for a minute when the potassium penicillin G began to separate rapidly in broad needles. The reaction-mixture was cooled, allowed to stand for an hour and filtered. Yield 3.1 g., assaying at 1522 iu/mgm.

Example 24

4.33 g. of the cyclohexylamine salt of penicillin G suspended and partly dissolved in 25 ml. of butanol were added to 1.4 g. of potassium isovalerate dissolved in 10 ml. butanol at about 60° C. The mixture was shaken vigorously for a minute, cooled and allowed to stand for an hour. The potassium penicillin G which had separated was filtered. Yield 2.9 g., assaying at 1510 iu/mgm.

Example 25

4.5 g. of the N-ethylpiperidine salt of penicillin G suspended and partly dissolved in 25 ml. of butanol were added to 1 g. of potassium acetate suspended and partly dissolved in 10 ml. butanol at about 60° C. The mixture was shaken vigorously and quickly deposited potassium penicillin G. The reaction-mixture was cooled and allowed to stand for an hour and filtered. Yield 3.3 g. assaying at 1530 iu/mgm.

Example 26

4.33 g. of the cyclohexylamine salt of penicillin G were suspended and partly dissolved in 25 ml. of butanol and added to 1.2 g. of ammonium acetate suspended and partly dissolved in 10 ml. of butanol at about 60° C. The mixture was shaken vigorously when the ammonium penicillin G began to separate in needles. The reaction-mixture was cooled and allowed to stand three hours. The ammonium penicillin G was filtered. Yield 1.2 g., assaying at 1560 iu/mgm.

Example 27

4.33 g. of the cyclohexylamine salt of penicillin G were suspended and partly dissolved in 25 ml. of butanol and added to 1.35 g. of ammonium caproate dissolved in 10 ml. of butanol at about 60° C. The mixture was shaken vigorously and the ammonium penicillin G began to separate. The reaction-mixture was cooled and allowed to stand for an hour and the ammonium penicillin G filtered. Yield 1.5 g., assaying at 1610 iu/mgm.

Example 28

2.25 g. of the N-ethylpiperidine salt of penicillin G were suspended and partly dissolved in 12.5 ml. of butanol and added to 0.4 g. of ammonium acetate suspended and partly dissolved in 5 ml. of butanol at about 60° C. The mixture was shaken vigorously and the ammonium penicillin began to separate quickly. The reaction-mixture was cooled and allowed to stand for two hours. Yield 1.75 g., assaying at 1506 iu/mgm.

I claim:

1. Process for the formation of sodium penicillin which comprises metathetically reacting an amine salt of penicillin and sodium acetate in a lower alkanol solution.

2. Process for the formation of ammonium penicillin which comprises metathetically reacting an amine salt of penicillin and ammonium acetate in a lower alkanol solution.

3. A process for the formation of a salt of penicillin selected from the group consisting of sodium penicillin and ammonium penicillin which comprises metathetically reacting an amine salt of penicillin with a salt selected from the group consisting of sodium acetate and ammonium acetate in a lower alkanol solution.

WINSTON KENNAY ANSLOW.

References Cited in the file of this patent

UNITED STATES PATENTS

| Number | Name | Date |
|---|---|---|
| 2,459,315 | Goldberg et al. | Jan. 18, 1949 |
| 2,463,943 | Behrens | Mar. 8, 1949 |

OTHER REFERENCES

British Report CMR–Br–234 (PB–79927), Dec. 5, 1947 received U. S. Apr. 18, 1946 (see 596 O. G. 144) page 4.

Abraham et al., "The British Journal of Exp't'l. Path." vol. 23, June 1942, page 113.

Heyden Report CMR–H–4, June 15, 1944, page 2.

Merck Report CMR–M–77, Sept. 28, 1945, pp. 1 to 3.